(12) United States Patent
La Pila et al.

(10) Patent No.: US 12,413,131 B2
(45) Date of Patent: Sep. 9, 2025

(54) METHOD AND APPARATUS FOR SENSING INDUCTOR INPUT/OUTPUT CURRENT IN A DC-DC CONVERTER CIRCUIT

(71) Applicant: STMicroelectronics S.r.l., Agrate Brianza (IT)

(72) Inventors: Marco La Pila, Gravina di Catania (IT); Giuseppe Platania, Valverde (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 199 days.

(21) Appl. No.: 18/225,912

(22) Filed: Jul. 25, 2023

(65) Prior Publication Data

US 2023/0378864 A1 Nov. 23, 2023

Related U.S. Application Data

(63) Continuation-in-part of application No. 17/748,214, filed on May 19, 2022, now Pat. No. 12,003,177.

(51) Int. Cl.
*H02M 1/00* (2007.01)
*H02M 3/158* (2006.01)

(52) U.S. Cl.
CPC ......... *H02M 1/0009* (2021.05); *H02M 3/158* (2013.01)

(58) Field of Classification Search
CPC ............................. H02M 1/0009; H02M 3/158
See application file for complete search history.

(56) References Cited

U.S. PATENT DOCUMENTS

| | | | |
|---|---|---|---|
| 7,202,694 B2 | 4/2007 | Eberlein | |
| 7,772,818 B2 | 8/2010 | Smith | |
| 7,795,846 B2 | 9/2010 | Martin | |
| 7,898,825 B2* | 3/2011 | Mulligan | H02M 3/33507 |
| | | | 363/21.13 |
| 8,044,644 B2 | 10/2011 | Huang et al. | |
| 8,159,203 B2* | 4/2012 | Derksen | H02M 3/158 |
| | | | 323/284 |
| 8,179,105 B2 | 5/2012 | Lipcsei | |
| 8,253,405 B2 | 8/2012 | Trivedi et al. | |
| 8,471,545 B2 | 6/2013 | Couleur et al. | |
| 8,482,271 B2* | 7/2013 | Prodic | H02M 3/1588 |
| | | | 323/283 |
| 8,736,244 B1 | 5/2014 | Voigtlander | |
| 9,285,399 B2 | 3/2016 | Babazadeh et al. | |
| 9,292,028 B2 | 3/2016 | Capodivacca et al. | |
| 9,350,158 B2 | 5/2016 | Chen et al. | |
| 9,739,810 B2 | 8/2017 | Childs | |
| 9,755,518 B2 | 9/2017 | Bansal et al. | |
| 9,812,963 B1 | 11/2017 | Nguyen et al. | |

(Continued)

*Primary Examiner* — Rafael O De Leon Domenech
(74) *Attorney, Agent, or Firm* — Crowe & Dunlevy LLC (57) ABSTRACT

A switching regulator circuit has a switching transistor actuated during a switching on phase of a duty cycle. The current flowing through an inductor of the switching regulator circuit is determined from sensing a transistor current flowing through the switching transistor during switching on phase and dividing the sensed transistor current by the duty cycle to generate an output signal indicative of the inductor current of the switching regulator circuit. The duty cycle is determined from a detected ratio of switching transistor turn on time during the switching on phase and switching transistor turn off time during a switching off phase as controlled by the duty cycle control of the regulator circuit.

27 Claims, 6 Drawing Sheets

(56) References Cited

U.S. PATENT DOCUMENTS

| | | |
|---|---|---|
| 10,270,342 B2 | 4/2019 | Pullen et al. |
| 10,454,369 B2 | 10/2019 | Savic et al. |
| 10,756,614 B2 | 8/2020 | Pullen et al. |
| 10,840,803 B2 | 11/2020 | Toni et al. |
| 10,892,683 B2 * | 1/2021 | Nam ................ H02M 3/157 |
| 11,193,961 B2 | 12/2021 | Schrom et al. |
| 11,460,873 B2 | 10/2022 | Nam et al. |
| 2009/0322300 A1 * | 12/2009 | Melanson ......... H02M 3/1563 |
| | | 323/284 |
| 2012/0019224 A1 * | 1/2012 | Lima ............... H02M 3/1588 |
| | | 323/282 |
| 2013/0082675 A1 | 4/2013 | Capodivacca et al. |
| 2015/0227146 A1 | 8/2015 | Knoedgen et al. |
| 2018/0219484 A1 | 8/2018 | Mercer et al. |
| 2018/0294804 A1 | 10/2018 | Ali |
| 2018/0375435 A1 | 12/2018 | Muhoberac et al. |
| 2019/0386561 A1 | 12/2019 | King et al. |
| 2021/0067041 A1 | 3/2021 | Cho et al. |
| 2021/0320590 A1 | 10/2021 | Ng et al. |
| 2021/0351697 A1 | 11/2021 | Tyagi et al. |
| 2022/0014102 A1 | 1/2022 | Sreenivas et al. |
| 2022/0029520 A1 | 1/2022 | Chen et al. |

* cited by examiner

METHOD AND APPARATUS FOR SENSING INDUCTOR INPUT/OUTPUT CURRENT IN A DC-DC CONVERTER CIRCUIT

CROSS REFERENCE TO RELATED APPLICATIONS

This application is a continuation-in-part of U.S. patent application Ser. No. 17/748,214, filed May 19, 2022, the disclosure of which is incorporated herein by reference.

TECHNICAL FIELD

The present disclosure generally concerns switching regulators such as DC-DC converters and, in particular, the measurement of inductor (input or output) current in a switching regulator.

BACKGROUND

A switching regulator is a circuit that receives power at a first voltage level from a power source and outputs power at a second, different, voltage level for use by a downstream electronic system (the load). It is known in the art for a switching regulator to monitor input current in connection with carrying out various circuit operations and functions. For example, the switching regulator may include a current control loop that monitors the input current and uses the monitored input current as a control variable in a feedback loop to control the behavior of the switching regulator. It is also useful to be able to monitor the output current delivered to the load to determine, for example, the output power provided by the switching regulator.

Figure 1:
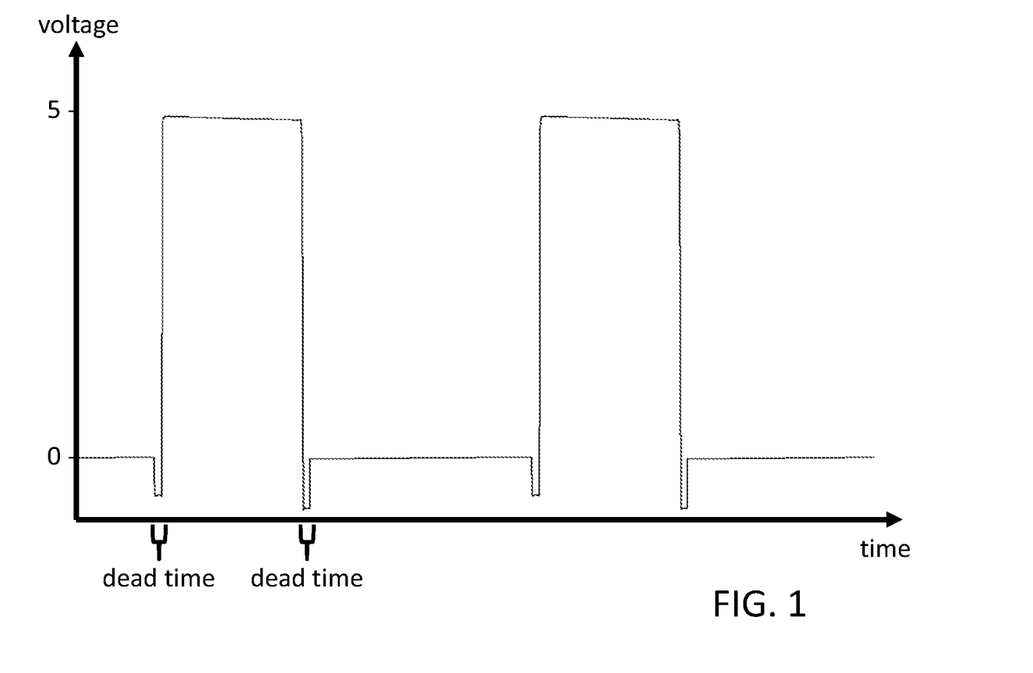
FIG. 1 shows a timing diagram for the voltage at the switching node of a buck-type switching regulator.

In a buck-type converter, for example, one known solution for determining the output current of the switching regulator is to sense the currents flowing through the high-side (HS) transistor switch and low-side (LS) transistor switch. Output current can then be calculated by summing the high-side and low-side currents. Those skilled in the art recognize, however, that the measurement of the low-side current is adversely affected by switching dead time at the switching node (see, FIG. 1 which shows buck converter operation where the dead times are on the LS transistor switch), during which no current through the HS or LS transistor switches can be sensed, despite the fact that the real current contribution is non-zero, and thus the summation of the high-side and low-side currents is an inaccurate measure of the actual output current of the switching regulator. The dead times in the switching node introduce a critical error in the summation-based high-side and low-side current measurement process. This error increases with increases in the switching frequency of the switching regulator.

There is accordingly a need in the art for a method and apparatus that can more accurately determine the inductor (input or output) current of a switching regulator.

SUMMARY

In an embodiment, a switching regulator circuit comprises: a high side (HS) transistor coupled between a first node and a switching node; a low side (LS) transistor coupled between the switching node and a second node; driver circuitry for controlling actuation of the HS transistor and LS transistor in accordance with a duty cycle including a switching on phase and a switching off phase delimited by dead time; and an inductor having a first terminal coupled to the switching node and a second terminal coupled to a third node, wherein a coil current flows through the inductor.

A coil current detection circuit of the switching regulator circuit comprises: a current sensing circuit configured to sense a transistor current flowing through only one of the HS transistor and LS transistor during the switching on phase and generate a first signal indicative of the sensed transistor current; and a duty cycle detect and divide circuit configured to detect said duty cycle which controls actuation of the HS transistor and LS transistor, and divide the first signal indicative of the sensed transistor current by said duty cycle to generate an output signal indicative of the coil current that flows through the inductor.

In an embodiment, a circuit for detecting a coil current flowing through an inductor of a switching regulator circuit having a switching transistor coupled to the inductor and driver circuitry for controlling actuation of the switching transistor in accordance with a duty cycle including a switching on phase and a switching off phase delimited by dead time comprises: a current sensing circuit configured to sense a transistor current flowing through the switching transistor during switching on phase of the duty cycle to generate a first signal indicative of the sensed transistor current; and a duty cycle detect and divide circuit configured to detect said duty cycle, and divide the first signal indicative of the sensed transistor current by said duty cycle to generate an output signal indicative of the coil current flowing through the inductor of the switching regulator circuit.

In an embodiment, a method for detecting a coil current flowing through an inductor of a switching regulator circuit having a switching transistor coupled to the inductor and driver circuitry for controlling actuation of the switching transistor in accordance with a duty cycle including a switching on phase and a switching off phase delimited by dead time comprises: sensing a transistor current flowing through the switching transistor during switching on phase to generate a first signal indicative of the sensed transistor current; detecting said duty cycle; and dividing the first signal indicative of the sensed transistor current by said duty cycle to generate an output signal indicative of the coil current flowing through the inductor of the switching regulator circuit.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

The determination of the output current of a buck-type switching regulator can advantageously be made dependent on a measurement of the current $I_{AVG}$ (HS) flowing through the high-side (HS) transistor switch during the switching on phase ($T_{ON}$). The average current in the inductor of the switching regulator (i.e., the regulator output current) is then extrapolated solely from the sensed high-side transistor switch current using the switching duty cycle set by the ratio of the switching on phase ($T_{ON}$) to the switching off phase ($T_{OFF}$) for the HS transistor switch.

Consider, for example, the following for a buck-type switching regulator. The average current $I_{AVG}$ (LS) flowing through the low-side (LS) transistor switch during the switching off phase ($T_{OFF}$) is given by:

$$I_{AVG}(LS) = I_{AVG}(HS) * \frac{T_{OFF}}{T_{ON}}$$

The output current $I_{OUT}$ of the switching regulator is then:

$$I_{OUT} = I_{AVG}(HS) + I_{AVG}(LS)$$

Substituting Gives:

$$I_{OUT} = I_{AVG}(HS) * \left(1 + \frac{T_{OFF}}{T_{ON}}\right) = I_{AVG}(HS) * \left(\frac{T_{ON} + T_{OFF}}{T_{ON}}\right)$$

Where the real duty cycle D for switching the high-side (HS) transistor and low-side (LS) transistor switches is:

$$D = \frac{T_{ON}}{T_{ON} + T_{OFF}}$$

In this context, the "real" duty cycle means the duty cycle defined by the real times when the HS transistor switch is on ($T_{ON}$) and when the LS transistor switch is on ($T_{OFF}$), not the ideal duty cycle ($V_{OUT}/V_{IN}$).

Simplified:

$$I_{OUT} = \frac{I_{AVG}(HS)}{D}$$

Thus, by sensing the current $I_{AVG}$(HS) flowing through the high-side (HS) transistor switch, and with knowledge of the real duty cycle D of the switching regulator, the output current of the switching regulator can be determined.

The current $I_{AVG}$(HS) can be measured through a power-power sense circuit (described in more detail below) and the real duty cycle D can be extrapolated from the ratio $$\frac{T_{OFF}}{T_{ON}}$$

through the drive signals which control switching of the high-side (HS) transistor and low-side (LS) transistor switches. A division of the measured current $I_{AVG}$ (HS) by the real duty cycle D of the switching regulator is then made by a detect and divide circuit (described in more detail below) to generate a value corresponding to the inductor output current of the switching regulator.

Figure 2:
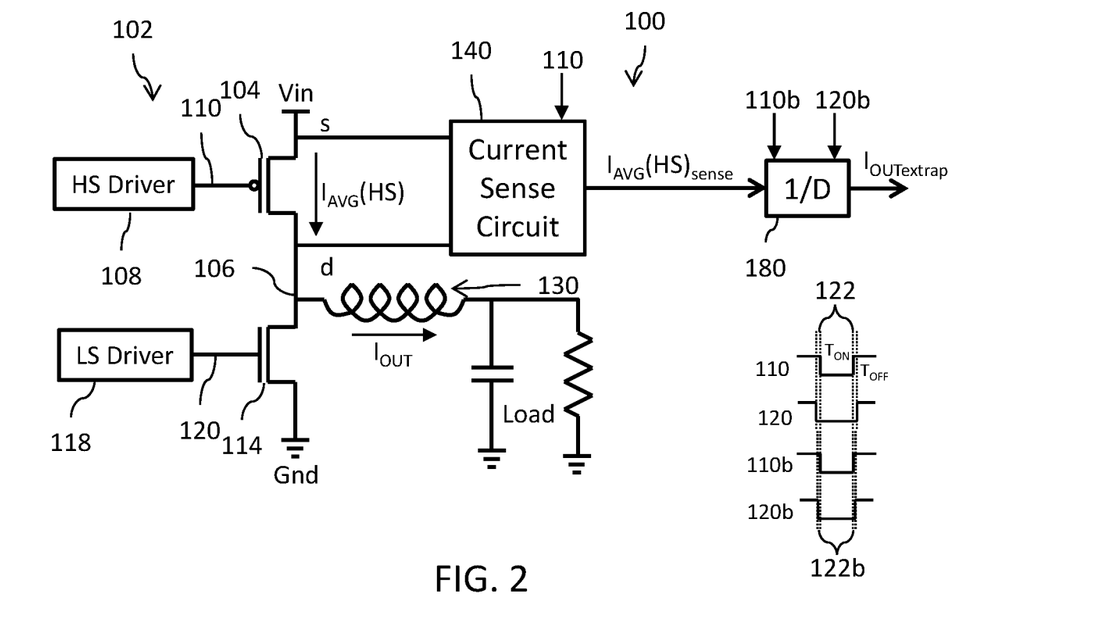
FIG. 2 is a block diagram showing a system including a buck-type switching regulator and an output current detection circuit that operates to determine the output current of the switching regulator.
Figure 3:
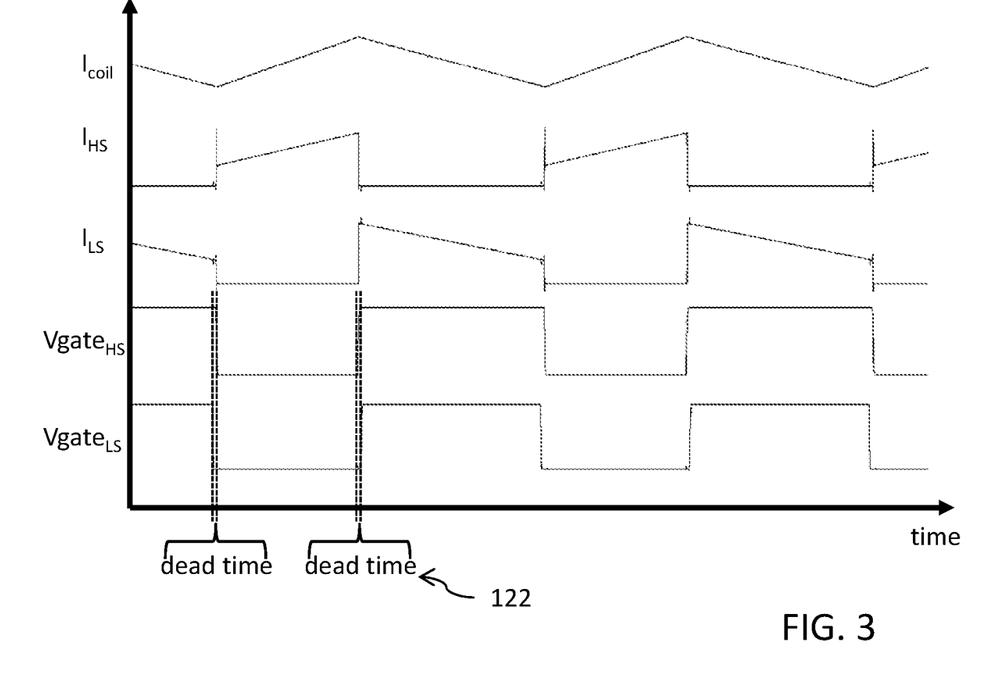
FIG. 3 illustrates waveforms for currents and voltages at certain nodes of the switching regulator shown in FIG. 2.

Reference is now made to FIG. 2 which shows a block diagram for an output current detection circuit 100 that operates to determine the output current of a switching regulator 102 (shown here to be of the buck-type, by example), and further to FIG. 3 which shows waveforms (in continuous conduction mode (CCM) operation) for currents and voltages at certain nodes of the buck-type switching regulator shown in FIG. 2. The switching regulator 102 includes a high-side (HS) transistor switch 104 (for example, implemented as a p-channel MOS transistor) having a source terminal coupled, preferably directly connected, to an input voltage Vin and a drain terminal coupled, preferably directly connected, to a switching node 106. The gate of the HS transistor switch 104 is driven by a high side driver circuit 108 that outputs a high side control signal 110 (Vgate$_{HS}$). A current $I_{HS}$ flows through the switch 104. The switching regulator 102 further includes a low-side (LS) transistor switch 114 (for example, implemented as an n-channel MOS transistor) having a drain terminal coupled, preferably directly connected, to the switching node 106 and a source terminal coupled, preferably directly connected, to a reference voltage node (for example, ground). The gate of the LS transistor switch 114 is driven by a low side driver circuit 118 that outputs a low side control signal 120 (Vgate$_{LS}$). A current $I_{LS}$ flows through the switch 114. In a preferred embodiment, the high side control signal 110 and the low side control signal 120 have a same frequency and are non-overlapping pulse width modulated (PWM) signals where the high side control signal 110 controls the HS transistor switch 104 to turn on during a switching on phase ($T_{ON}$) and turn off during a switching off phase ($T_{OFF}$). In an embodiment, the low side control signal 120 may be derived from the high side control signal 110 with a small margin (referred to as dead time 122) to avoid both transistors being on at the same time. The low side control signal 120 controls the LS transistor switch 114 to turn on during a portion of the switching off phase ($T_{OFF}$) which is delimited by the dead time 122 due to the non-overlapping switch control. An inductor 130 has a first terminal coupled, preferably directly connected, to the switching node 106 and a second terminal coupled, preferably directly connected, to an output node. A current $I_{coil}$ flows through the inductor 130. A load circuit (represented here by a load capacitance and resistance in parallel) is coupled to the output node.

The output current detection circuit 100 includes a high side current sensing circuit 140 configured to sense the current $I_{AVG}(HS)$, also referred to as the current $I_{HS}$, flowing through the HS transistor switch 104 and output a signal indicative of the sensed current $I_{AVG}(HS)_{sense}$. A duty cycle detect and divide circuit (1/D) 180 receives a high side control signal 110b and a low side control signal 120b. The signals 110b and 120b are derived from (or related to) the signals 110 and 120, respectively, which control the switching on phase ($T_{ON}$) and switching off phase ($T_{OFF}$) but have a shorter dead time 122b than the dead time 122 for the signals 110 and 120 (see, FIG. 2) and are thus more accurately representative of the real duty cycle D of the switching regulator operation. The signal indicative of the sensed current $I_{AVG}(HS)_{sense}$ is then divided by the determined real duty cycle D to generate an output signal that is indicative of the extrapolated value $I_{OUTextrap}$ for the output current $I_{OUT}$ of the switching regulator.

Figure 4:
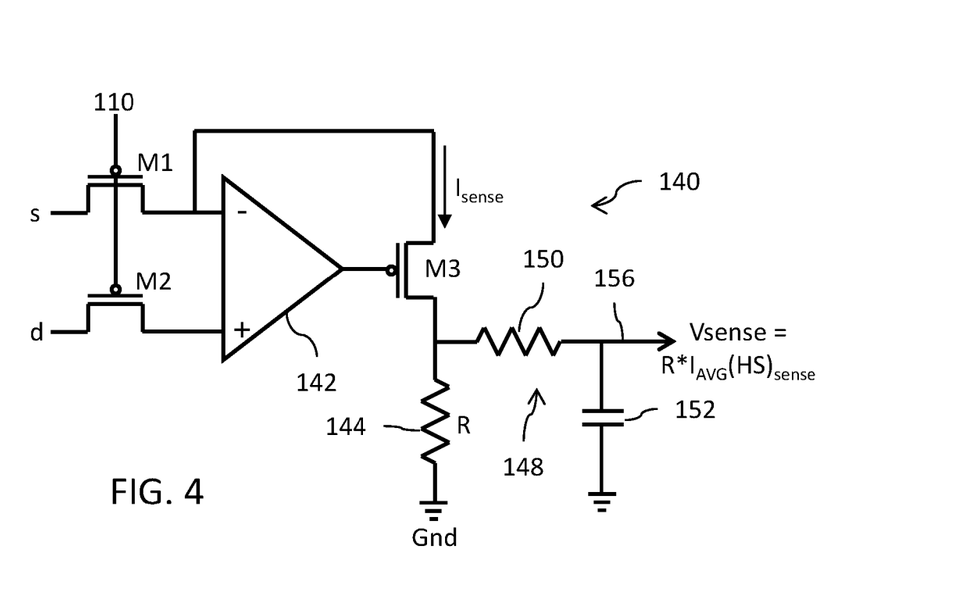
FIG. 4 is a circuit diagram for a current sensing circuit of the output current detection circuit in FIG. 2.

Reference is now made to FIG. 4 which shows a circuit diagram for an embodiment of the current sensing circuit 140. A first input transistor M1 (for example, implemented as a p-channel MOS transistor) has a source terminal coupled, preferably directly connected, to the source terminal (s) of the HS transistor switch 104 (at the input voltage Vin) and a drain terminal coupled, preferably directly connected, to a first (inverting (−)) input of a differential amplifier 142. The gate terminal of the first input transistor M1 is driven by the high side control signal 110. A second input transistor M2 (for example, implemented as a p-channel MOS transistor) has a source terminal coupled, preferably directly connected, to the drain terminal (d) of the HS transistor switch 104 (at the switching node 106) and a drain terminal coupled, preferably directly connected, to a second (non-inverting (+)) input of the differential amplifier 142. The gate terminal of the second input transistor M2 is also driven by the high side control signal 110. Input transistors M1 and M2 are controlled by the high side control signal 110 to turn on during the switching on phase ($T_{ON}$). An output transistor M3 (for example, implemented as a p-channel MOS transistor) has a source terminal coupled, preferably directly connected, in a negative feedback circuit to the first (inverting) input of the differential amplifier 142. A resistor 144 with a fixed resistance R has a first terminal coupled, preferably directly connected, to a drain terminal of the output transistor M3 and a second terminal coupled, preferably directly connected, to the reference voltage node (for example, ground). A passive low-pass filter circuit 148 formed by the series circuit connection of a resistor 150 and capacitor 152 is coupled, preferably directly connected, between the drain terminal of the output transistor M3 and the reference voltage node. A series connection node 156 of the low-pass filter circuit 148 between the resistor 150 and capacitor 152 provides an output of the current sensing circuit 140 producing the signal Vsense indicative of the sensed current $I_{AVG}(HS)_{sense}$. The first and second input transistors M1, M2 function to sample the source and drain voltages, respectively, of the HS transistor switch 104 responsive to the high side control signal 110 only during switching on phase ($T_{ON}$) for application to the differential amplifier 142. The difference between those sampled voltages is converted by the differential amplifier 142 and output transistor M3 to a current $I_{sense}$ which replicates the current flowing through the inductor 130 during switching on phase ($T_{ON}$). This current $I_{sense}$ is converted to a voltage by resistor 144 and the voltage is smoothed by the low pass filter circuit 148 to generate the output voltage signal Vsense.

Figure 5A:
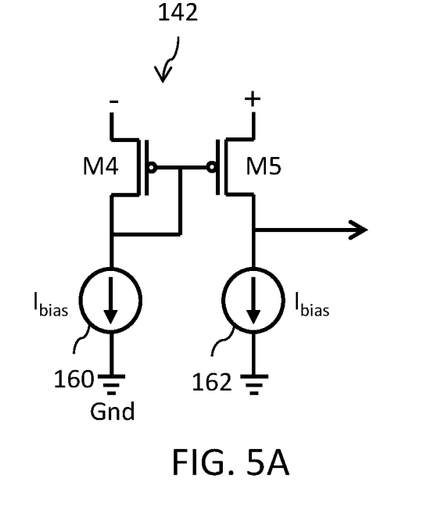
FIGS. 5A and 5B are circuit diagram for embodiments of an amplifier used in a current sensing circuit.

FIG. 5A shows a circuit diagram for an embodiment of the differential amplifier 142. A first amplifier transistor M4 (for example, implemented as a p-channel MOS transistor) has a source terminal coupled, preferably directly connected, to the inverting (−) input of the differential amplifier 142 and a drain terminal biased by a first current sink circuit 160 configured to sink a current $I_{bias}$ to the reference voltage node. A second amplifier transistor M5 (for example, implemented as a p-channel MOS transistor) has a source terminal coupled, preferably directly connected, to the non-inverting (+) input of the differential amplifier 142 and a drain terminal biased by a second current sink circuit 162 configured to sink the current $I_{bias}$ to the reference voltage node. The gate terminals of the transistors M4 and M5 are coupled, preferably directly connected, to each other and to the drain terminal of the transistor M4.

Let K be a ratio of power to power sense. During the switching on phase ($T_{ON}$) when the high side control signal 110 is asserted logic low, transistors 104, M1 and M2 are all turned on. If the gain of the differential amplifier 142 is high enough to ensure that the voltages at the inverting (−) input and non-inverting (+) input of the differential amplifier 142 are substantially equal (through the negative feedback with transistor M3), then the following is true:

$$V_{106} - K*R_{on}*I_{bias} = Vin - K*R_{on}*(I_{bias} + I_{sense})$$

Where: $V_{106}$ is the voltage at the switching node 106, $R_{on}$ is drain-to-source resistance of the transistor 104 in the ON state (i.e., Rds_on), $I_{bias}$ is the bias current for the current sink circuits 160, 162, and $I_{sense}$ is the current flowing through the transistor M3.

Then, the sensed current $I_{AVG}(HS)_{sense}$ is:

$$I_{AVG}(HS)_{sense} = \frac{Vin - V_{106}}{K*R_{on}} = \frac{I_{out\_on}}{K}$$

Where: $I_{out\_on}$ is the average of the current flowing through the inductor 130 when the transistor 104 in the ON state.

It will accordingly be noted that the current $I_{out\_on}$ and its replica current $I_{sense}$ (i.e., $I_{AVG}(HS)_{sense}$) increase with a ratio of K. In this context, K is substantially constant, and it allows to have the current $I_{sense}$ be directly proportional to the current flowing through the inductor 130 when the HS transistor switch 104 is in the ON state. It is important that the value for K is large enough to have the magnitude of $I_{sense}$ in a range of some micro-amperes, despite an output current $I_{out\_on}$ that has a magnitude on the order of amperes.

The signal at the output of the current sensing circuit 140 that is indicative of the sensed current $I_{AVG}(HS)_{sense}$ is actually a low pass filtered voltage Vsense that is equal to $R*I_{AVG}(HS)_{sense}$ where R is the resistance of the resistor 144.

Figure 6:
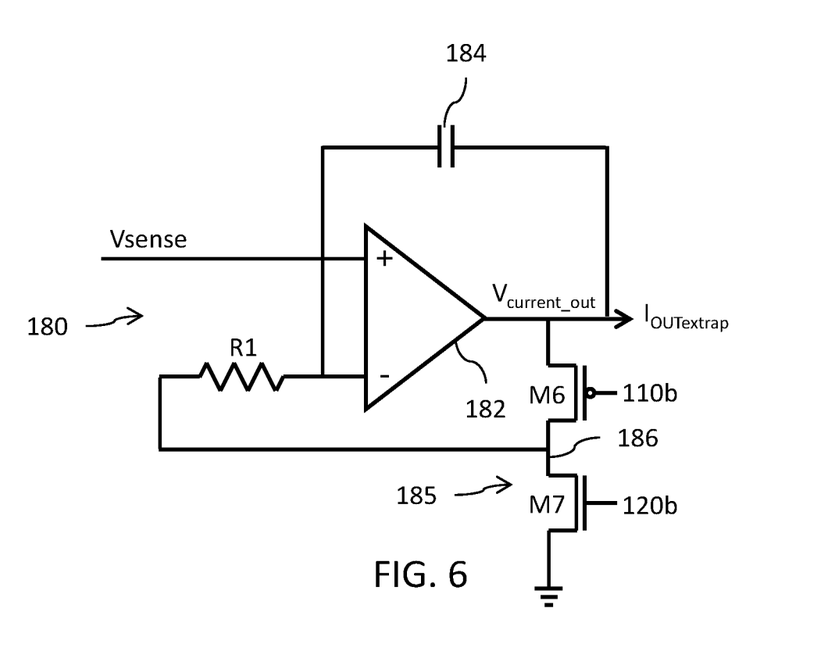
FIGS. 6 and 7 are circuit diagrams for a duty cycle detect and divide circuit of the output current detection circuit in FIG. 2.

Reference is now made to FIG. 6 which shows a circuit diagram for an embodiment of the duty cycle detect and divide circuit 180. A differential amplifier 182 includes a non-inverting (+) input coupled to receive the voltage Vsense (which is indicative of the sensed current $I_{AVG}(HS)_{sense}$ in the HS transistor switch 104 during the switching on phase ($T_{ON}$)). The output of the differential amplifier 182 is coupled, preferably directly connected, to the inverting (−) input in negative feedback by a capacitor 184. This forms a unity gain analog integration circuit that functions to integrate (i.e., average) the difference in voltages at the non-inverting (+) input and inverting (−) input. The voltage at the non-inverting (+) input is the voltage Vsense. The voltage at the inverting (−) input is a switched voltage selected by a voltage switching circuit 185 controlled by the ratio $$\frac{T_{ON}}{T_{OFF}}$$

to be equal to either the voltage $V_{current\_out}$ at the output of the differential amplifier 182 or the reference voltage (i.e., ground voltage).

The voltage switching circuit 185 includes a first switching transistor M6 (for example, implemented as a p-channel MOS transistor) having a source terminal coupled, preferably directly connected, to the output of the differential amplifier 182 and a drain terminal coupled, preferably directly connected, to a switching node 186. The first switching transistor M6 is controlled by signal 110b to turn on during the $T_{ON}$ state (i.e., when transistor 104 is turned on by the high side control signal 110). Thus, the gate of transistor M6 may be configured to receive the control signal 110b and is turned on when control signal 110b is asserted (logic low). A second switching transistor M7 (for example, implemented as an n-channel MOS transistor) has a drain terminal coupled, preferably directly connected, to the switching node 186 and a source terminal coupled, preferably directly connected, to the reference voltage node. The second switching transistor M7 is controlled by signal 120b to turn on during the $T_{OFF}$ state (i.e., when transistor 104 is turned off by the high side control signal 110). Thus, the gate of transistor M7 may be configured to receive the control signal 120b and is turned on when control signal 120b is asserted (logic high).

The signal generated at the switching node 186 is equal, on average, to $D*V_{current\_out}$, where $V_{current\_out}$ is the voltage at the output of the differential amplifier 182. When the first switching transistor M6 is turned on during the switching on phase ($T_{ON}$), the voltage $V_{current\_out}$ at the output of the differential amplifier 182 is applied to the inverting (−) input of the differential amplifier 182. The differential amplifier 182 will respond to this by driving the voltage $V_{current\_out}$ toward the voltage Vsense−$V_{current\_out}$. Conversely, when the second switching transistor M7 is turned on during the switching off phase ($T_{OFF}$), the reference voltage (ground) is instead applied to the inverting (−) input of the differential amplifier 182. The differential amplifier 182 will respond to this by driving the voltage $V_{current\_out}$ toward the voltage Vsense. Over time, due to the averaging function provided by the unity gain integration on capacitor 184, the voltage $V_{current\_out}$ at the output of the differential amplifier 182 will settle at a value equal to:

$$V_{current\_out} = V\,sense*\left(\frac{T_{ON}+T_{OFF}}{T_{ON}}\right) = \frac{V\,sense}{D}$$

In other words, supposing that the voltage at the (+) and (−) inputs of the amplifier 182 are equal, the following equation applies:

$$V_{current\_out} = V\,sense*\frac{1}{D} = \frac{R}{K}\frac{1}{D}I_{HS} = \frac{R}{K}I_{OUT}$$

Where: R is the resistance of resistor 144 of FIG. 4.

The voltage $V_{current\_out}$ at the output of the differential amplifier 182 is the signal indicative of the extrapolated value $I_{OUTextrap}$ for the output current $I_{OUT}$ of the switching regulator.

Figure 7:
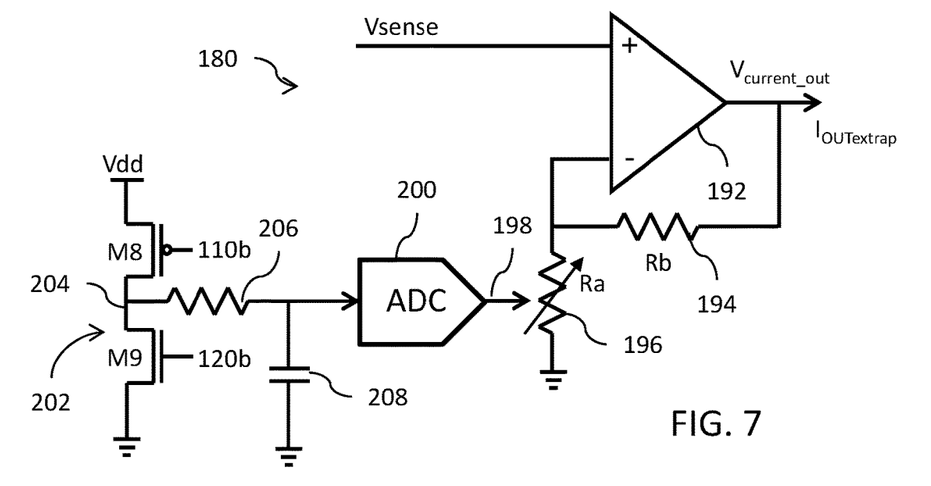

Reference is now made to FIG. 7 which shows a circuit diagram for another embodiment of the duty cycle detect and divide circuit 180. A differential amplifier 192 includes a non-inverting (+) input coupled to receive the voltage Vsense (which is indicative of the sensed current $I_{AVG}(HS)_{sense}$ in the HS transistor switch 104 during the switching on phase ($T_{ON}$)). The output of the differential amplifier 192 is coupled, preferably directly connected, to the inverting (−) input in negative feedback by a resistor 194 having a fixed resistance Rb. The inverting (−) input is further coupled to ground through a resistor 196 having a variable resistance Ra. The value of the variable resistance Ra is digitally controlled by the bits of a digital selection signal 198 generated by an analog-to-digital converter (ADC) circuit 200. This circuit is essentially a non-inverting operational amplifier with a controllable gain dependent on the resistances Ra and Rb (where the amplifier gain $$G = \left(1+\frac{Rb}{Ra}\right)\right).$$

A voltage switching circuit 202 includes a first switching transistor M8 (for example, implemented as a p-channel MOS transistor) having a source terminal coupled, preferably directly connected, to a supply voltage Vdd and a drain terminal coupled, preferably directly connected, to a switching node 204. The first switching transistor M8 is controlled by signal 110b to turn on during the $T_{ON}$ state (i.e., when transistor 104 is turned on by the high side control signal 110). Thus, the gate of transistor M8 may be configured to receive the control signal 110b and is turned on when control signal 110b is asserted (logic low). A second switching transistor M9 (for example, implemented as an n-channel MOS transistor) has a drain terminal coupled, preferably directly connected, to the switching node 204 and a source terminal coupled, preferably directly connected, to the reference voltage node (ground). The second switching transistor M9 is controlled by signal 120b to turn on during the $T_{OFF}$ state (i.e., when transistor 104 is turned off by the high side control signal 110). Thus, the gate of transistor M9 may be configured to receive the control signal 120b and is turned on when control signal 120b is asserted (logic high). The switching node 204 is coupled to the input of the ADC circuit 200 through a low-pass filter circuit formed by resistor 206 and capacitor 208.

The voltage at the switching node 204 is a switched voltage selected by the voltage switching circuit 202 controlled by the ratio $$\frac{T_{ON}}{T_{OFF}}$$

to be equal to either the supply voltage Vdd or the reference voltage (i.e., ground voltage). Analog filtering of the switched voltage by the low-pass filter circuit produces an input voltage to the ADC circuit 200 equal, on average, to D*Vdd. This switched and filtered voltage is converted by the ADC circuit 200 to generate the digital selection signal 198 for controlling the variable resistance Ra of the resistor 196. The resistances Ra, Rb of the resistors 196, 194 set the gain of the differential amplifier 192 applied to the voltage Vsense (indicative of the sensed current $I_{AVG}(HS)_{sense}$ in the HS transistor switch 104 during the switching on phase ($T_{ON}$)) which is applied to the non-inverting (+) input.

The following relationship is achieved through the non-inverting amplifier circuit using the differential amplifier 192 with resistors 194 and 196:

$$V_{current\_out} = V\,sense\left(1 + \frac{Rb}{Ra}\right)$$

The variable resistance Ra of the resistor 196 is digitally controlled to satisfy the following relationship:

$$1 + \frac{Rb}{Ra} = \frac{1}{D}$$

Because Ra must satisfy the foregoing equation, this means that:

$$Ra = \frac{D}{1-D}Rb$$

Where the resistance Rb is fixed. If we consider, as an example, the ADC circuit 200 with a three-bit resolution, the input signal D*Vdd is then quantized to eight levels, with the following Table defining the relationship of the variable resistance Ra as a function of the duty cycle and the fixed resistance Rb:

| D | Ra |
|---|---|
| 0 | 0 |
| 1/8 | Rb/7 |
| 2/8 | Rb/3 |
| 3/8 | 3*Rb/5 |
| 4/8 | Rb |
| 5/8 | 5*Rb/3 |
| 6/8 | 3*Rb |
| 7/8 | 7*Rb |

The output of the ADC circuit 200 controls the variable resistor 196 to select the correct resistance Ra. This can be accomplished, for example, using an analog multiplexer having mux inputs connected to resistances for the possible values of Ra, a control input connected to the output of the ADC circuit 200 and a mux output connected to resistor Rb and the input of amplifier 192.

It will be noted that the implementation with a three-bit resolution is just an example, and this concept is extendible to a higher resolution to provide higher accuracy in the selection of the variable resistance value.

Because of the foregoing relationship between D, Ra and Rb, the following equation applies:

$$V_{current\_out} = V\,sense * \frac{1}{D} = \frac{R}{K}\frac{1}{D}I_{HS} = \frac{R}{K}I_{OUT}$$

Where: R is the resistance of resistor 144 in FIG. 4.

The voltage $V_{current\_out}$ at the output of the differential amplifier 192 is the signal indicative of the extrapolated value $I_{OUTextrap}$ for the output current $I_{OUT}$ of the switching regulator.

FIG. 3 illustrates operation of the buck converter in continuous conduction mode (CCM). It will, however, be noted that the current sensing circuit 140 and duty cycle detect and divide circuit 180 can also operate to sense inductor output current during ON time when the converter is instead configured for operation in discontinuous conduction mode (DCM). In this case, beyond the ON and OFF times, a high-impedance state is present when the coil current is zero. In this high-impedance state: transistors 104, 114 are turned off, transistors M6, M7 are turned off, and transistors M8, M9 are turned off.

The foregoing technique for buck-type regulator circuit output current determination is also applicable in the context of determining the input current of a boost-type regulator circuit.

The determination of the input current of a boost-type switching regulator can advantageously be made dependent on a measurement of the current $I_{AVG}$ (LS) flowing through the low-side (LS) transistor switch during the switching on phase ($T_{ON}$). The average current in the inductor of the switching regulator (i.e., the regulator input current) is then extrapolated solely from the sensed low-side current using the switching duty cycle set by the ratio of the switching on phase ($T_{ON}$) to the switching off phase ($T_{OFF}$) for the LS transistor switch.

Consider, for example, the following for a boost-type switching regulator. The average current $I_{AVG}$ (HS) flowing through the high-side (HS) transistor switch during the switching off phase ($T_{OFF}$) is given by:

$$I_{AVG}(HS) = I_{AVG}(LS) * \frac{T_{OFF}}{T_{ON}}$$

The input current $I_{IN}$ of the switching regulator is then:

$$I_{IN} = I_{AVG}(HS) + I_{AVG}(LS)$$

Substituting Gives:

$$I_{IN} = I_{AVG}(LS) * \left(1 + \frac{T_{OFF}}{T_{ON}}\right) = I_{AVG}(LS) * \left(\frac{T_{ON} + T_{OFF}}{T_{ON}}\right)$$

Where the real duty cycle D for switching the high-side (HS) transistor and low-side (LS) transistor switches is:

$$D = \frac{T_{ON}}{T_{ON} + T_{OFF}}$$

In this context, the "real" duty cycle means the duty cycle defined by the real times when the LS transistor switch is on ($T_{ON}$) and when the HS transistor switch is on ($T_{OFF}$), not the ideal duty cycle ($V_{OUT}/V_{IN}$).

Simplified:

$$I_{IN} = \frac{I_{AVG}(LS)}{D}$$

Thus, by sensing the current $I_{AVG}$ (LS) flowing through the low-side (LS) transistor switch, and with knowledge of the real duty cycle D of the switching regulator, the input current of the switching regulator can be determined.

The current $I_{AVG}$ (LS) can be measured through a power-power sense circuit (described in more detail below) and the real duty cycle D can be extrapolated from the ratio $$\frac{T_{ON}}{T_{OFF}}$$

through the drive signals which control switching of the low-side (LS) transistor and high-side (HS) transistor switches. A division of the measured current $I_{AVG}$(LS) by the real duty cycle D of the switching regulator is then made by a detect and divide circuit (described in more detail below) to generate a value corresponding to the input current of the switching regulator.

Figure 8:
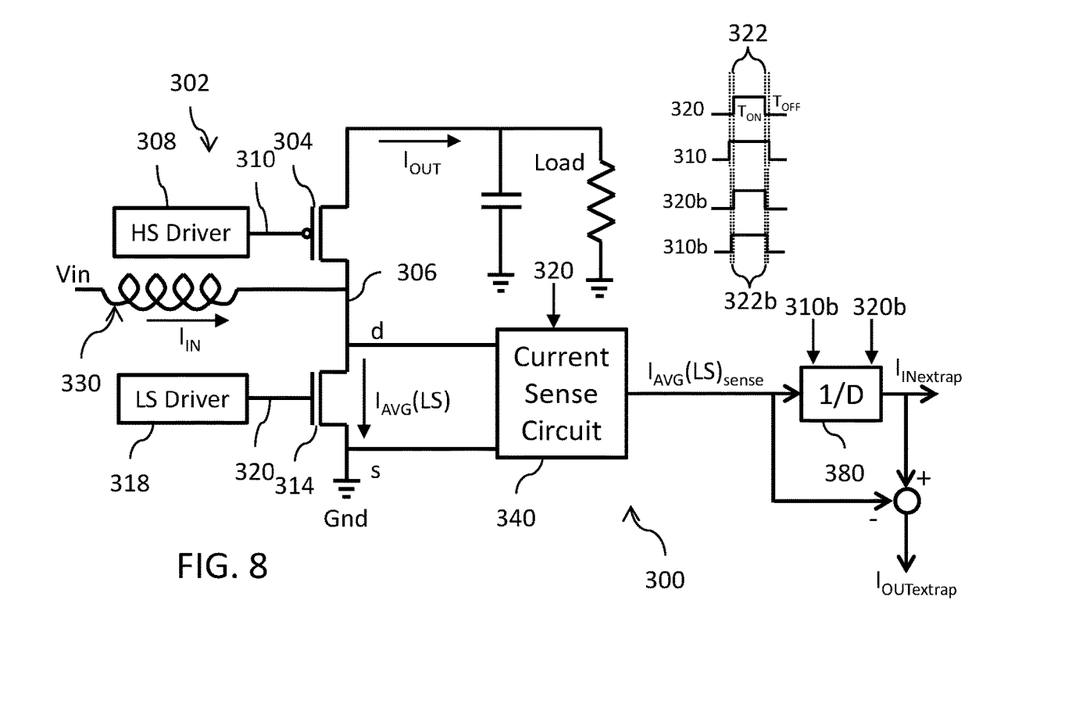
FIG. 8 is a block diagram showing a system including a boost-type switching regulator and an input current detection circuit that operates to determine the input current of the switching regulator.
Figure 9:
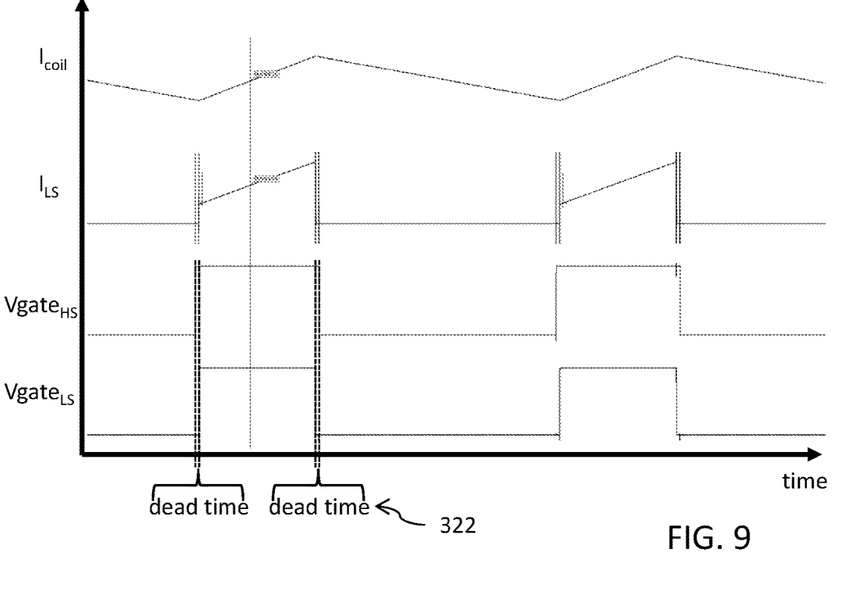
FIG. 9 illustrates waveforms for currents and voltages at certain nodes of the switching regulator shown in FIG. 8.

Reference is now made to FIG. 8 which shows a block diagram for an input current detection circuit 300 that operates to determine the input current of a switching regulator 302 (shown here to be of the boost-type, by example), and further to FIG. 9 which shows waveforms (in continuous conduction mode (CCM) operation) for currents and voltages at certain nodes of the switching regulator shown in FIG. 8. The switching regulator 302 includes a high-side (HS) transistor switch 304 (for example, implemented as a p-channel MOS transistor) having a source terminal coupled, preferably directly connected, to an output node and a drain terminal coupled, preferably directly connected, to a switching node 306. The gate of the HS transistor switch 304 is driven by a high side driver circuit 308 that outputs a high side control signal 310 (Vgate$_{HS}$). A current $I_{HS}$ (also referred to the as the regulator output current $I_{OUT}$) flows through the switch 304 to an output node. A load circuit (represented here by a load capacitance and resistance in parallel) is coupled to the output node. The switching regulator 302 further includes a low-side (LS) transistor switch 314 (for example, implemented as an n-channel MOS transistor) having a drain terminal coupled, preferably directly connected, to the switching node 306 and a source terminal coupled, preferably directly connected, to a reference voltage node (for example, ground). The gate of the LS transistor switch 314 is driven by a low side driver circuit 318 that outputs a low side control signal 320 (Vgate$_{LS}$). A current $I_{LS}$ flows through the switch 314. In a preferred embodiment, the high side control signal 310 and the low side control signal 320 have a same frequency and are non-overlapping pulse width modulated (PWM) signals where the low side control signal 320 controls the LS transistor switch 314 to turn on during a switching on phase ($T_{ON}$) and turn off during a switching off phase ($T_{OFF}$). In an embodiment, the high side control signal 310 may be derived from the low side control signal 320 with a small margin (referred to as dead time) to avoid both transistors being on at the same time. The high side control signal 310 controls the HS transistor switch 304 to turn on during a portion of the switching off phase ($T_{OFF}$) which is delimited by a dead time 322 due to the non-overlapping switch control. An inductor 330 has a first terminal coupled, preferably directly connected, to the switching node 306 and a second terminal coupled, preferably directly connected, to receive an input voltage Vin. A current $I_{coil}$ (also referred to herein as an input current $I_{IN}$) flows through the inductor 330.

The input current detection circuit 300 includes a low side current sensing circuit 340 configured to sense the current $I_{AVG}$(LS), also referred to as the current $I_{LS}$, flowing through the LS transistor switch 314 and output a signal indicative of the sensed current $I_{AVG}$ (LS)$_{sense}$. A duty cycle detect and divide circuit (1/D) 380 receives a high side control signal 310b and a low side control signal 320b. The signals 310b and 320b are derived from (related to) the signals 310 and 320, respectively, which control the switching on phase ($T_{ON}$) and switching off phase ($T_{OFF}$) but have a shorter dead time 322b than the dead time 322 for the signals 310 and 320 (see, FIG. 8) and are thus more accurately representative of the real duty cycle D of the switching regulator operation. The signal indicative of the sensed current $I_{AVG}$ (LS)$_{sense}$ is then divided by the determined real duty cycle D to generate an output signal that is indicative of the extrapolated value $I_{INextrap}$ for the input current $I_{IN}$ of the switching regulator.

Figure 10:
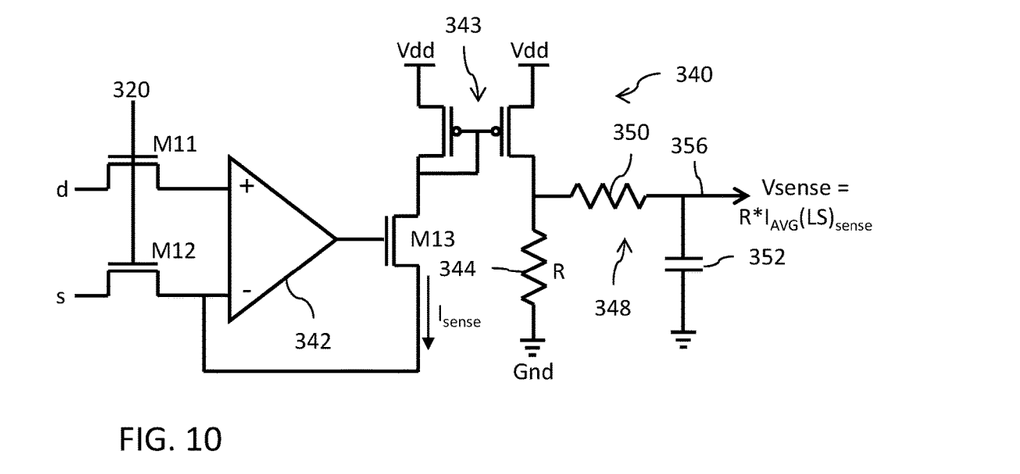
FIG. 10 is a circuit diagram for a current sensing circuit of the input current detection circuit in FIG. 8.

Reference is now made to FIG. 10 which shows a circuit diagram for an embodiment of the current sensing circuit 340. A first input transistor M11 (for example, implemented as an n-channel MOS transistor) has a source terminal coupled, preferably directly connected, to the drain terminal (d) of the LS transistor switch 314 (at the switching node 306) and a drain terminal coupled, preferably directly connected, to a first (non-inverting (+)) input of a differential amplifier 342. The gate terminal of the first input transistor M11 is driven by the low side control signal 320. A second input transistor M12 (for example, implemented as an n-channel MOS transistor) has a source terminal coupled, preferably directly connected, to the source terminal (s) of the LS transistor switch 314 (at the reference node; ground) and a drain terminal coupled, preferably directly connected, to a second (inverting (−)) input of the differential amplifier 342. The gate terminal of the second input transistor M12 is also driven by the low side control signal 320. Input transistors M11 and M12 are controlled by the low side control signal 320 to turn on during the switching on phase ($T_{ON}$). An output transistor M13 (for example, implemented as an n-channel MOS transistor) has a source terminal coupled, preferably directly connected, in a negative feedback circuit to the second (inverting) input of the differential amplifier 342. A drain terminal of the output transistor M13 is connected to an input leg of a current mirroring circuit 343 (formed by mirror connected p-channel MOS transistors). A resistor 344 has a first terminal coupled, preferably directly connected, to an output leg of the current mirroring circuit 343 and a second terminal coupled, preferably directly connected, to the reference voltage node (for example, ground). A passive low-pass filter circuit 348 formed by the series circuit connection of a resistor 350 and capacitor 352 is coupled, preferably directly connected, between the output leg of the current mirroring circuit 343 and the reference voltage node. A series connection node 356 of the low-pass filter circuit 348 between the resistor 350 and capacitor 352 provides an output of the current sensing circuit 340 producing the signal indicative of the sensed current $I_{AVG}$(LS)$_{sense}$. The first and second input transistors M11, M12 function to sample the drain and source voltages, respectively, of the LS transistor switch 314 responsive to the low side control signal 320 only during switching on phase ($T_{ON}$) for application to the differential amplifier 342. The difference between those sampled voltages is converted by the differential amplifier 342 and output transistor M13 to a current $I_{sense}$ which replicates the current flowing through the inductor 330 during switching on phase ($T_{ON}$). This current $I_{sense}$ is mirrored by the current mirroring circuit 343 and converted to a voltage by resistor 344 and the voltage is smoothed by the low pass filter circuit 348 to generate an output voltage Vsense.

Figure 5B:
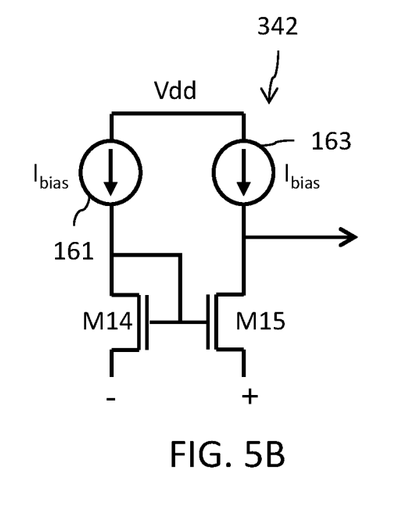

FIG. 5B shows a circuit diagram for an embodiment of the differential amplifier 342. A first amplifier transistor M14 (for example, implemented as an n-channel MOS transistor) has a source terminal coupled, preferably directly connected, to the inverting (−) input of the differential amplifier 342 and a drain terminal biased by a first current source circuit 161 configured to source a current $I_{bias}$ from a supply voltage node. A second amplifier transistor M15 (for example, implemented as an n-channel MOS transistor) has a source terminal coupled, preferably directly connected, to the non-inverting (+) input of the differential amplifier 342 and a drain terminal biased by a second current source circuit 163 configured to source the current $I_{bias}$ from the supply voltage node. The gate terminals of the transistors M14 and M15 are coupled, preferably directly connected, to each other and to the drain terminal of the transistor M14.

Let K be a ratio of power to power sense. During the switching on phase ($T_{ON}$) when the low side control signal 320 is asserted, transistors 314, M11 and M12 are all turned on. If the gain of the differential amplifier 342 is high enough to ensure that the voltages at the inverting (−) input and non-inverting (+) input of the differential amplifier 342 are substantially equal (through the negative feedback with transistor M13), the following is true:

$$V_{306} - K*R_{on}*I_{bias} = -K*R_{on}*(I_{bias} - I_{sense})$$

Where: $V_{306}$ is the voltage at the switching node 306, $R_{on}$ is drain-to-source resistance of the transistor 314 in the ON state (i.e., Rds_on), $I_{bias}$ is the bias current for the current source circuits 161, 163, and $I_{sense}$ is the current flowing through the transistor M13.

Then, the sense current $I_{sense}$ is:

$$I_{sense} = \frac{V_{306}}{K*R_{on}} = \frac{I_{LS}}{K}$$

Where: $I_{LS}$ is the current flowing through the inductor 330 when the transistor 314 in the ON state.

It will accordingly be noted that the current $I_{LS}$ and its replica current $I_{sense}$ increase with a ratio of K. In this context, K is substantially constant, and it allows to have the current $I_{sense}$ directly proportional to the current flowing through the inductor 330 when the LS transistor switch 314 is in the ON state. It is important that the value for K is large enough to have the magnitude of $I_{sense}$ in a range of some micro-amperes, despite an inductor current $I_{LS}$ that has a magnitude on the order of amperes.

After mirroring by the current mirroring circuit 343, the signal at the output of the current sensing circuit 340 that is indicative of the sensed current $I_{AVG}$ $(LS)_{sense}$ is actually a low pass filtered voltage Vsense that is equal to $R*I_{AVG}$ $(LS)_{sense}$ where R is the resistance of the resistor 344.

Figure 11:
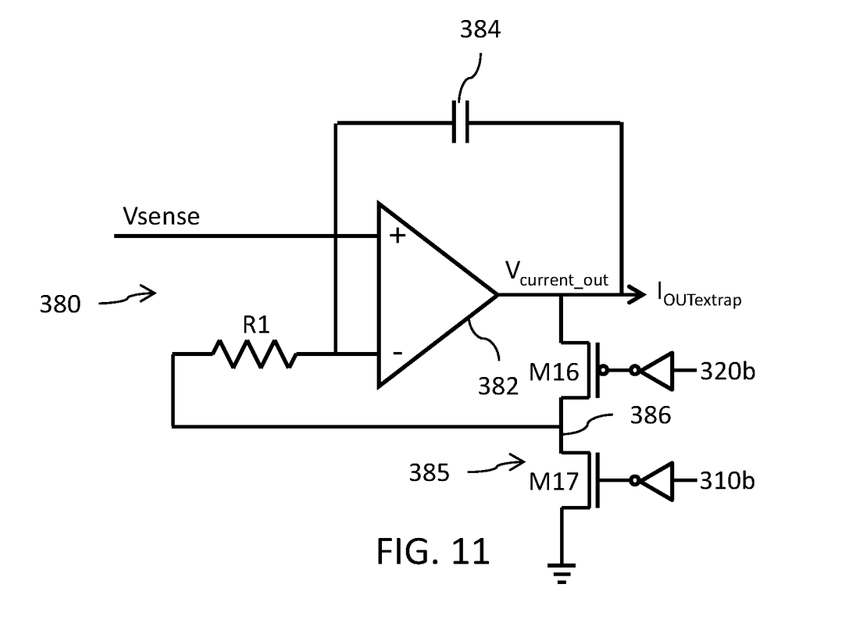
FIGS. 11 and 12 are circuit diagrams for a duty cycle detect and divide circuit of the input current detection circuit in FIG. 8.

Reference is now made to FIG. 11 which shows a circuit diagram for an embodiment of the duty cycle detect and divide circuit 380. A differential amplifier 382 includes a non-inverting (+) input coupled to receive the voltage Vsense (which is indicative of the sensed current $I_{AVG}$ $(LS)_{sense}$ in the LS transistor switch 314 during the switching on phase ($T_{ON}$)). The output of the differential amplifier 382 is coupled, preferably directly connected, to the inverting (−) input in negative feedback by a capacitor 384. This forms a unity gain analog integration circuit that functions to integrate (i.e., average) the difference in voltages at the non-inverting (+) input and inverting (−) input. The voltage at the non-inverting (+) input is the voltage Vsense. The voltage at the inverting (−) input is a switched voltage selected by a voltage switching circuit 385 controlled by the ratio $$\frac{T_{ON}}{T_{OFF}}$$

to be equal to either the voltage $V_{current\_out}$ at the output of the differential amplifier 382 or the reference voltage (i.e., ground voltage).

The voltage switching circuit 385 includes a first switching transistor M16 (for example, implemented as a p-channel MOS transistor) having a source terminal coupled, preferably directly connected, to the output of the differential amplifier 382 and a drain terminal coupled, preferably directly connected, to a switching node 386. The first switching transistor M16 is controlled by a logical inverse of the signal 320b to turn on during $T_{ON}$ state (i.e., when transistor 314 is turned on by the low side control signal 320). Thus, the gate of transistor M16 may be configured to receive the logical inverse of the signal 320b and is turned on when control signal 320b is asserted (logic high). A second switching transistor M17 (for example, implemented as an n-channel MOS transistor) has a drain terminal coupled, preferably directly connected, to the switching node 386 and a source terminal coupled, preferably directly connected, to the reference voltage node. The second switching transistor M17 is controlled by a logical inverse of the signal 310b during $T_{OFF}$ state (i.e., when transistor 314 is turned off by the low side control signal 320). Thus, the gate of transistor M17 may be configured to receive the logical inverse of signal 310b and is turned on when control signal 310b is asserted (logic low). The switching node 386 is coupled in negative feedback through resistor R1 to the inverting (−) input of the differential amplifier 382. The signal generated at the switching node 386 is equal, on average, to $D*V_{current\_out}$, where $V_{current\_out}$ is the voltage at the output of the differential amplifier 382. When the first switching transistor M16 is turned on during the switching on phase ($T_{ON}$), the voltage $V_{current\_out}$ at the output of the differential amplifier 382 is applied to the inverting (−) input of the differential amplifier 382. The differential amplifier 382 will respond to this by driving the voltage $V_{current\_out}$ toward the voltage Vsense−$V_{current\_out}$. Conversely, when the second switching transistor M17 is turned on during the switching off phase ($T_{OFF}$), the reference voltage (ground) is instead applied to the inverting (−) input of the differential amplifier 382. The differential amplifier 382 will respond to this by driving the voltage $V_{current\_out}$ toward the voltage Vsense. Over time, due to the averaging function provided by the unity gain integration on capacitor 384, the voltage $V_{current\_out}$ at the output of the differential amplifier 382 will settle at a value equal to:

$$V_{current\_out} = Vsense * \left(\frac{T_{ON} + T_{OFF}}{T_{ON}}\right) = \frac{Vsense}{D}$$

In other words, supposing that the voltage at the (+) and (−) inputs of the amplifier 382 are equal, the following equation applies:

$$V_{current\_out} = Vsense * \frac{1}{D} = \frac{R}{K}\frac{1}{D}I_{LS} = \frac{R}{K}I_{IN}$$

Where: R is is the resistance of resistor 344 in FIG. 10.

The voltage $V_{current\_out}$ at the output of the differential amplifier 382 is the signal indicative of the extrapolated value $I_{INextrap}$ for the input current $I_{IN}$ of the switching regulator.

Figure 12:
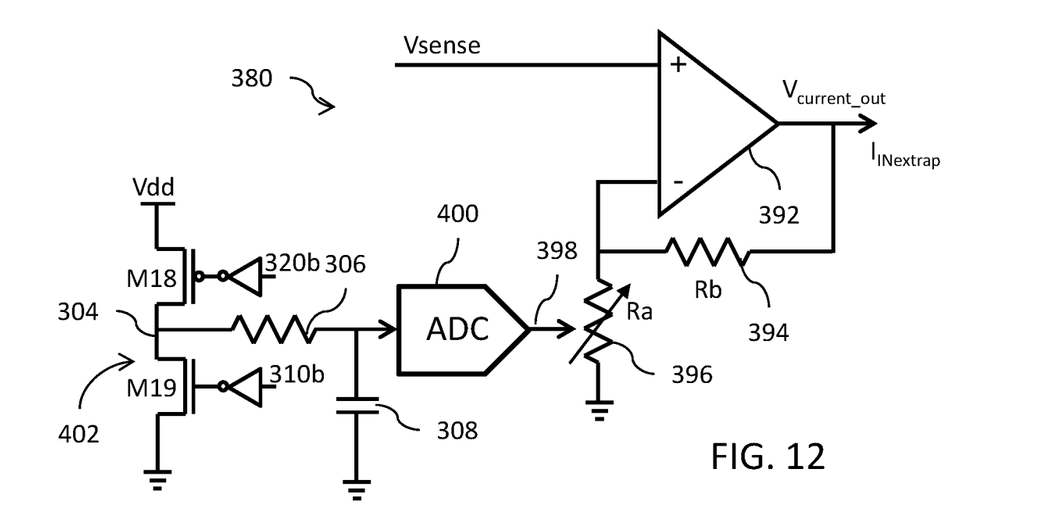

Reference is now made to FIG. 12 which shows a circuit diagram for another embodiment of the duty cycle detect and divide circuit 380. A differential amplifier 392 includes a non-inverting (+) input coupled to receive the voltage Vsense (which is indicative of the sensed current $I_{AVG}(LS)_{sense}$ in the LS transistor switch 314 during the switching on phase ($T_{ON}$)). The output of the differential amplifier 392 is coupled, preferably directly connected, to the inverting (−) input in negative feedback by a resistor 394 having a fixed resistance Rb. The inverting (−) input is further coupled to ground through a resistor 396 having a variable resistance Ra. The value of the variable resistance Ra is digitally controlled by the bits of a digital selection signal 398 generated by an analog-to-digital converter (ADC) circuit 400. This circuit is essentially a non-inverting operational amplifier with a controllable gain dependent on the resistances Ra and Rb (where the amplifier gain $$G = \left(1 + \frac{Rb}{Ra}\right)).$$

A voltage switching circuit 402 includes a first switching transistor M18 (for example, implemented as a p-channel MOS transistor) having a source terminal coupled, preferably directly connected, to a supply voltage Vdd and a drain terminal coupled, preferably directly connected, to a switching node 304. The first switching transistor M18 is controlled by a logical inverse of signal 320b to turn on during $T_{ON}$ state (i.e., when transistor 314 is turned on by the low side control signal 320). Thus, the gate of transistor M18 may be configured to receive the logical inverse of signal 320b and is turned on when control signal 320b is asserted (logic high). A second switching transistor M19 (for example, implemented as an n-channel MOS transistor) has a drain terminal coupled, preferably directly connected, to the switching node 304 and a source terminal coupled, preferably directly connected, to the reference voltage node (ground). The second switching transistor M19 is controlled by a logical inverse of signal 310b to turn on during $T_{OFF}$ state (i.e., when transistor 314 is turned off by the low side control signal 320). Thus, the gate of transistor M19 may be configured to receive the logical inverse of signal 310b and is turned on when control signal 310b is asserted (logic low). The switching node 304 is coupled to the input of the ADC circuit 400 through a low-pass filter circuit formed by resistor 306 and capacitor 308.

The voltage at the switching node 304 is a switched voltage selected by the voltage switching circuit 402 controlled by the ratio $$\frac{T_{ON}}{T_{OFF}}$$

to be equal to either the supply voltage Vdd or the reference voltage (i.e., ground voltage). Analog filtering of the switched voltage by the low-pass filter circuit produces an input voltage to the ADC circuit 400 equal, on average, to D*Vdd. This switched and filtered voltage is converted by the ADC circuit 400 to generate the digital selection signal 398 for controlling the variable resistance Ra of the resistor 396. The resistances Ra, Rb of the resistors 396, 394 set the gain of the differential amplifier 392 applied to the voltage Vsense (indicative of the sensed current $I_{AVG}(LS)_{sense}$ in the LS transistor switch 314 during the switching on phase ($T_{ON}$)) which is applied to the non-inverting (+) input.

The following relationship is achieved through the non-inverting amplifier circuit using the differential amplifier 392 with resistors 394 and 396:

$$V_{current\_out} = Vsense\left(1 + \frac{Rb}{Ra}\right)$$

The variable resistance Ra of the resistor 396 is digitally controlled to satisfy the following relationship:

$$1 + \frac{Rb}{Ra} = \frac{1}{D}$$

Because Ra must satisfy the foregoing equation, this means that:

$$Ra = \frac{D}{1-D}Rb$$

Where the resistance Rb is fixed. If we consider, as an example, the ADC circuit 400 with a three-bit resolution, the input signal D*Vdd is then quantized to eight levels, with the following Table defining the relationship of the variable resistance Ra as a function of the duty cycle and the fixed resistance Rb:

| D | Ra |
| --- | --- |
| 0 | 0 |
| 1/8 | Rb/7 |
| 2/8 | Rb/3 |
| 3/8 | 3*Rb/5 |
| 4/8 | Rb |
| 5/8 | 5*Rb/3 |
| 6/8 | 3*Rb |
| 7/8 | 7*Rb |

The output of the ADC circuit 400 controls the variable resistor 396 to select the correct resistance Ra. This can be accomplished, for example, using an analog multiplexer having inputs connected to resistances for the possible values of Ra, a control input connected to the output of the ADC circuit 400 and an output connected to resistor Rb and the input of amplifier 392.

It will be noted that the implementation with a three-bit resolution is just an example, and this concept is extendible to a higher resolution to provide higher accuracy in the selection of the variable resistance value.

Because of the foregoing relationship between D, Ra and Rb, the following equation applies:

$$V_{current\_out} = Vsense * \frac{1}{D} = \frac{R}{K}\frac{1}{D}I_{LS} = \frac{R}{K}I_{IN}$$

Where: R is the resistance of resistor 344 of FIG. 10.

The voltage $V_{current\_out}$ at the output of the differential amplifier 392 is the signal indicative of the extrapolated value $I_{INextrap}$ for the input current $I_{IN}$ of the switching regulator.

Reference is once again made to FIG. 8. The output current $I_{OUT}$ of the switching regulator is the current that flow through the high side transistor 304 to the load. This current is the difference between the input current $I_{IN}$ of the switching regulator and the current $I_{LS}$ of the low side transistor 314. To extract a value for the output current $I_{OUT}$, and generate a signal indicative of the extrapolated value $I_{OUTextrap}$ for the output current $I_{OUT}$ of the switching regulator, a summation circuit subtracts the sensed current $I_{AVG}$ (LS)$_{sense}$ in the LS transistor switch 314 from the extrapolated value $I_{INextrap}$ for the input current $I_{IN}$.

FIG. 9 illustrates operation of the boost converter in continuous conduction mode (CCM). It will, however, be noted that the current sensing circuit 340 and duty cycle detect and divide circuit 380 can also operate for sensing inductor input current during ON time where the converter is instead configured for operation in discontinuous conduction mode (DCM). In this case, beyond the ON and OFF times, a high-impedance state is present when the coil current is zero. In this high-impedance state: transistors 304, 314 are turned off, transistors M16, M17 are turned off, and transistors M18, M19 are turned off.

Although illustrated herein by example only for the calculation of switching regulator output current for a buck-type circuit (FIG. 2) and the calculation of switching regulator input current for a boost-type circuit (FIG. 8), it will be understood that the technique disclosure herein is equally applicable to current detection in other types of switching regulator circuits (buck-boost, inverting, etc.).

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A switching regulator circuit, comprising:
   a high side (HS) transistor coupled between a first node and a switching node;
   a low side (LS) transistor coupled between the switching node and a second node;
   driver circuitry for controlling actuation of the HS transistor and LS transistor in accordance with a duty cycle including a switching on phase and a switching off phase with a first dead time delimiting the switching off phase;
   an inductor having a first terminal coupled to the switching node and a second terminal coupled to a third node, wherein a coil current flows through the inductor; and
   a coil current detection circuit comprising:
      a current sensing circuit configured to sense a transistor current flowing through only one of the HS transistor and LS transistor during the switching on phase and generate a first signal indicative of the sensed transistor current; and
      a duty cycle detect and divide circuit configured to detect said duty cycle which controls actuation of the HS transistor and LS transistor, and divide the first signal indicative of the sensed transistor current by said duty cycle to generate an output signal indicative of the coil current that flows through the inductor.

2. The circuit of claim 1, wherein the switching regulator circuit is a buck-type regulator circuit, wherein the first node is configured to receive an input voltage, the second node is configured to receive a reference voltage and the third node is an output voltage node, and wherein the coil current is output current from the buck-type regulator circuit.

3. The circuit of claim 1, wherein the switching regulator circuit is a boost-type regulator circuit, wherein the first node is an output voltage node, the second node is configured to receive a reference voltage and the third node is configured to receive an input voltage, and wherein the coil current is input current to the boost-type regulator circuit.

4. The circuit of claim 1, wherein said duty cycle detect and divide circuit comprises:
   a first differential amplifier having a first input coupled to receive the first signal indicative of the sensed transistor current and a second input and an output producing said output signal;
   a capacitor coupled in feedback between the output of the first differential amplifier and the second input;
   a first switching transistor coupled between the output of the first differential amplifier and a further switching node, said first switching transistor controlled to turn on corresponding to the switching on phase for the duty cycle;
   a second switching transistor coupled between the further switching node and the second node, said second switching transistor controlled to turn on corresponding to the switching off phase for the duty cycle; and
   a feedback path coupled between the further switching node and the second input of the first differential amplifier.

5. The circuit of claim 4, wherein the first and second switching transistors are controlled by signals have a second dead time shorter than the first dead time.

6. The circuit of claim 1, wherein said duty cycle detect and divide circuit comprises:
   a first differential amplifier having a first input coupled to receive the first signal indicative of the sensed transistor current and a second input and an output producing said output signal;
   a capacitor coupled in feedback between the output of the first differential amplifier and the second input; and
   a switching feedback circuit controlled in response to alternation between the switching on phase and switching off phase with a second dead time shorter than the first dead time to alternately apply a signal at the output of the first differential amplifier and a reference voltage to the second input of the first differential amplifier.

7. The circuit of claim 1, wherein said duty cycle detect and divide circuit comprises:
   a first differential amplifier having a first input coupled to receive the first signal indicative of the sensed transistor current and a second input and an output producing said output signal;

a first resistor having a fixed resistance Rb coupled in feedback between the output of the first differential amplifier and the second input;
a second resistor having a variable resistance Ra coupled between the second input and the second node;
a first switching transistor coupled between a supply voltage node and a further switching node, said first switching transistor controlled to turn on corresponding to the switching on phase for the duty cycle;
a second switching transistor coupled between the further switching node and the second node, said second switching transistor controlled to turn on corresponding to the switching off phase for the duty cycle; and
an analog-to-digital converter circuit configured to convert a voltage output from the further switching node to a digital control signal for controlling selection of the variable resistance Ra of the second resistor.

8. The circuit of claim 7, wherein the digital control signal selects the variable resistance Ra to satisfy the following equation:

$$1 + \frac{Rb}{Ra} = \frac{1}{D}$$

where D is the duty cycle.

9. The circuit of claim 7, wherein the first and second switching transistors are controlled by signals have a second dead time shorter than the first dead time.

10. The circuit of claim 1, wherein said current sensing circuit comprises:
a second differential amplifier having a first input, a second input and an output;
a first input transistor coupled between a first terminal of said one of the HS transistor and LS transistor and the first input of the second differential amplifier;
a second input transistor coupled between a second terminal of said one of the HS transistor and LS transistor and the second input of the second differential amplifier;
wherein said first and second input transistors are actuated during switching on phase for the duty cycle;
an output transistor coupled between the first input of the second differential amplifier and a first intermediate node; and
a resistor coupled between the first intermediate node and the second node;
wherein said first signal indicative of the sensed transistor current is derived from a voltage across said resistor.

11. The circuit of claim 10, wherein said current sensing circuit further comprises a low pass filter circuit coupled between the first intermediate node and the second node, said low pass filter circuit having a second intermediate node outputting the first signal indicative of the sensed transistor current.

12. The circuit of claim 1, wherein said current sensing circuit comprises:
a second differential amplifier having a first input, a second input and an output;
a first input transistor coupled between a first terminal of said one of the HS transistor and LS transistor and the first input of the second differential amplifier;
a second input transistor coupled between a second terminal of said one of the HS transistor and LS transistor and the second input of the second differential amplifier;
wherein said first and second input transistors are actuated during switching on phase for the duty cycle;
an output transistor coupled between the first input of the second differential amplifier and a first intermediate node;
a current mirror having an input leg coupled to the first intermediate node and an output leg coupled to a second intermediate node; and
a resistor coupled between the second intermediate node and the second node;
wherein said first signal indicative of the sensed transistor current is derived from a voltage across said resistor.

13. The circuit of claim 12, wherein said current sensing circuit further comprises a low pass filter circuit coupled between the second intermediate node and the second node, said low pass filter circuit having a third intermediate node outputting the first signal indicative of the sensed transistor current.

14. A circuit for detecting a coil current flowing through an inductor of a switching regulator circuit having a switching transistor coupled to the inductor and driver circuitry for controlling actuation of the switching transistor in accordance with a duty cycle including a switching on phase and a switching off phase delimited by dead time, comprising:
a current sensing circuit configured to sense a transistor current flowing through the switching transistor during switching on phase of the duty cycle to generate a first signal indicative of the sensed transistor current; and
a duty cycle detect and divide circuit configured to detect said duty cycle, and divide the first signal indicative of the sensed transistor current by said duty cycle to generate an output signal indicative of the coil current flowing through the inductor of the switching regulator circuit.

15. The circuit of claim 14, wherein the switching regulator circuit is a buck-type regulator circuit, wherein the switching transistor is a high-side transistor, and wherein the coil current is output current from the buck-type regulator circuit.

16. The circuit of claim 14, wherein the switching regulator circuit is a boost-type regulator circuit, wherein the switching transistor is a low-side transistor, and wherein the coil current is input current to the boost-type regulator circuit.

17. The circuit of claim 14, wherein said duty cycle detect and divide circuit comprises:
a first differential amplifier having a first input coupled to receive the first signal indicative of the sensed transistor current and a second input and an output producing said output signal;
a capacitor coupled in feedback between the output of the first differential amplifier and the second input; and
a switching feedback circuit controlled in response to the switching on phase and switching off phase of said duty cycle to alternately apply a signal at the output of the first differential amplifier and a reference voltage to the second input of the first differential amplifier.

18. The circuit of claim 14, wherein said duty cycle detect and divide circuit comprises:
a first differential amplifier having a first input coupled to receive the first signal indicative of the sensed transistor current and a second input and an output producing said output signal;
a first resistor having a fixed resistance Rb coupled in feedback between the output of the first differential amplifier and the second input;

a second resistor having a variable resistance Ra coupled between the second input and the second node;

an analog-to-digital converter circuit configured to convert a control voltage to a digital control signal for controlling selection of the variable resistance Ra of the second resistor; and a switching feedback circuit controlled in response to the switching on phase and switching off phase of said duty cycle to alternately select a supply voltage and a ground voltage in generating said control voltage.

19. The circuit of claim 18, wherein the digital control signal selects the variable resistance Ra to satisfy the following equation:

$$1 + \frac{Rb}{Ra} = \frac{1}{D}$$

where D is the duty cycle.

20. The circuit of claim 14, wherein said current sensing circuit comprises:

a second differential amplifier having a first input, a second input and an output;

a first input transistor coupled between a first terminal of said switching transistor and the first input of the second differential amplifier;

a second input transistor coupled between a second terminal of said switching transistor and the second input of the second differential amplifier;

wherein said first and second input transistors are actuated during switching on phase for the duty cycle; and an output transistor coupled between the first input of the second differential amplifier and a first intermediate node to generate said first signal indicative of the sensed transistor current.

21. A method for detecting a coil current flowing through an inductor of a switching regulator circuit having a switching transistor coupled to the inductor and driver circuitry for controlling actuation of the switching transistor in accordance with a duty cycle including a switching on phase and a switching off phase delimited by dead time, comprising:

sensing a transistor current flowing through the switching transistor during switching on phase to generate a first signal indicative of the sensed transistor current;

detecting said duty cycle; and dividing the first signal indicative of the sensed transistor current by said duty cycle to generate an output signal indicative of the coil current flowing through the inductor of the switching regulator circuit.

22. The method of claim 21, wherein the switching regulator circuit is a buck-type regulator circuit, wherein the switching transistor is a high-side transistor, and wherein the coil current is output current from the buck-type regulator circuit.

23. The method of claim 21, wherein the switching regulator circuit is a boost-type regulator circuit, wherein the switching transistor is a low-side transistor, and wherein the coil current is input current to the boost-type regulator circuit.

24. The method of claim 21, wherein sensing the transistor current comprises:

sampling a first voltage at a first terminal of the switching transistor during switching on phase;

sampling a second voltage at a second terminal of the switching transistor during switching on phase;

differentially processing the first and second voltages to generate a sensed current replicating the transistor current flowing through the switching transistor;

converting the sensed current to a voltage; and smoothing the voltage to generate said first signal indicative of the sensed transistor current.

25. The method of claim 21, wherein detecting and dividing comprises:

integrating a difference between the first signal indicative of the sensed transistor current and a switched signal;

wherein said switched signal has a first value during the switching on phase of the duty cycle and wherein the switched signal has a second value during the switching off phase of the duty cycle;

wherein the first value is the output signal and the second value is a reference value.

26. The method of claim 21, wherein detecting and dividing comprises:

amplifying the first signal indicative of the sensed transistor current by a gain value generate the output signal;

generating a switched signal having a first value during the switching on phase of the duty cycle and a second value during the switching off phase of the duty cycle;

filtering and converting the switched signal to a digital control signal;

selecting the gain value using the digital control signal.

27. The method of claim 26, wherein the first value is a supply voltage value and the second value is a reference value.

* * * * *